Patented July 19, 1938

2,123,987

UNITED STATES PATENT OFFICE 2,123,987

PRODUCING MATTING EFFECTS ON ARTIFICIAL SILK

Karl Brodersen and Matthias Quaedvlieg, Dessau in Anhalt, Albert Schneider, Leverkusen-Wiesdorf, and Herbert Gensel, Leverkusen I. G. Werk, Germany, assignors to I. G. Farbenindustrie Aktiengesellschaft, Frankfort-on-the-Main, Germany No Drawing. Application October 8, 1937, Serial No. 168,044. In Germany October 30, 1936

3 Claims. (Cl. 28—1)

Our present invention relates to a process for matting artificial silk and more particularly to such a process according to which an inorganic pigment is incorporated into the already finished thread or fabric.

It is based on the observation that for attaining a matt effect on artificial fibers the pigment, such as barium sulfate, zinc sulfide, titanium dioxide and the like, may be applied in the form of a suspension in a solution of a water-soluble salt of an organic base derived from guanidine and containing in its molecule the radicle of a hydrocarbon with at least 10 carbon atoms.

As salts of amines suitable for the said purpose we enumerate, for instance, the following:—dodecylbiguanide hydrochloride, stearyl biguanide hydrochloride, stearylamino-amino-oxazolidine, iminostearylaminomethylimidazoline, other compounds of this class bearing other higher alkyl radicles than dodecyl and stearyl and the alkyl and hydroxyalkyl derivatives thereof, obtainable by alkylating or hydroxalkylating the guanidine derivatives in question.

It is advantageous to prepare first a paste from the pigment and a solution of the salt of the base and to dilute this as required for use. The good durability of the matt appearance of the artificial silk reveals the surprising fact that in this procedure not only the base but also the pigment is absorbed by the fiber and retained in a manner fast to rinsing.

In comparison with known processes in which a pigment is brought into a form suitable for matting with the aid of Turkey red oils, alcohol sulfonates and similar preparations, the invention requires the use of a considerably smaller proportion of pigment and yields matt effects which are fast to washing and are durable.

The following examples illustrate the invention:—

Example 1.—1 gram of a pigment (titanium dioxide, zinc sulfide, barium sulfate or the like) is made into a suspension with a solution of 0.15 gram of dodecylbiguanide hydrochloride. In some cases it may be useful to add about 0.075 to 0.1 gram of stearylsarcosine-triethanol-amide in order to increase the stability of the solution during matting. The solution is diluted to 1 liter with water and artificial silk is matted in the bath so prepared.

Stearylmethylaminomethylene - dimethylamine can also be used with the same result as the base having affinity for the fiber.

Example 2.—1 gram of zinc sulfide is made into a suspension with 0.2 gram of stearylbiguanide hydrochloride and the suspension is diluted with water to 1 liter. The dispersion so obtained has a strongly substantive character; it is used for matting artificial silk.

It is obvious that our invention is not limited to the foregoing examples nor to the specific details given therein and another guanidine derivative as mentioned above may be used in an analogous manner. As may be stated the pigment which is to be brought upon the fiber does not necessitate any specific pretreatment in order to be absorbed.

What we claim is:—

1. A process for producing matt effects on artificial silk which comprises treating the artificial silk fiber with a suspension of a pigment in a solution of a water-soluble salt of a guanidine derivative of the group consisting of alkylbiguanide, alkylamino-amino-oxazolidine, iminoalkylaminomethylimidazoline (the alkyl radicle containing at least 10 carbon atoms) and the alkyl and hydroxyalkyl derivative thereof.

2. A process for producing matt effects on artificial silk which comprises treating the artificial silk fiber with a suspension of a pigment in a solution of an alkylbiguanide containing in the alkyl radicle more than 10 carbon atoms.

3. A process for producing matt effects on artificial silk which comprises treating the artificial silk fiber with a suspension of a pigment in a solution of stearylbiguanide.

KARL BRODERSEN.
MATTHIAS QUAEDVLIEG.
ALBERT SCHNEIDER.
HERBERT GENSEL.